US011520601B2

(12) United States Patent
Griffin et al.

(10) Patent No.: US 11,520,601 B2
(45) Date of Patent: Dec. 6, 2022

(54) DEVICE LINKED CONTEXT IDENTIFICATION AND NOTIFICATION

(71) Applicant: International Business Machines Corporation, Armonk, NY (US)

(72) Inventors: Adam L. Griffin, Dubuque, IA (US); Shikhar Kwatra, Durham, NC (US); Jeremy R. Fox, Georgetown, TX (US); Craig M. Trim, Ventura, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 357 days.

(21) Appl. No.: 16/550,136

(22) Filed: Aug. 23, 2019

(65) Prior Publication Data
US 2021/0055936 A1    Feb. 25, 2021

(51) Int. Cl.
| | | |
|---|---|---|
| *G06F 9/4401* | (2018.01) | |
| *G06F 9/46* | (2006.01) | |
| *G06F 1/3246* | (2019.01) | |
| *G06F 1/3212* | (2019.01) | |

(52) U.S. Cl.
CPC ............ *G06F 9/442* (2013.01); *G06F 1/3212* (2013.01); *G06F 1/3246* (2013.01); *G06F 9/461* (2013.01)

(58) Field of Classification Search
None
See application file for complete search history.

(56) References Cited

U.S. PATENT DOCUMENTS

| | | | |
|---|---|---|---|
| 8,660,355 B2 | 2/2014 | Rodriguez et al. | |
| 8,737,986 B2 | 5/2014 | Rhoads et al. | |
| 9,922,186 B1* | 3/2018 | Kahn | G06F 21/34 |
| 2005/0255893 A1* | 11/2005 | Jin | H04W 52/0277 |
| | | | 455/572 |
| 2014/0297268 A1 | 10/2014 | Govrin et al. | |
| 2015/0262435 A1* | 9/2015 | Delong | G07C 5/085 |
| | | | 340/439 |

(Continued)

OTHER PUBLICATIONS

Mell et al., "Effectively and Securely Using the Cloud Computing Paradigm" dated Oct. 7, 2009, NIST, Information Technology Laboratory, Total 80 pages.

(Continued)

*Primary Examiner* — Paul Yen
(74) *Attorney, Agent, or Firm* — Konrad, Raynes, Davda & Victor LLP; Janaki K. Davda

(57) ABSTRACT

Provided is device linked context identification and notification. Context data of a user profile of a user is retrieved from an external storage. The context data is analyzed to place user activities of the user and surrounding activities around the user in activity categories and to assign tags for the user activities and the surrounding activities. In response to receiving a notification that shutdown of a first device being used by the user is about to occur, current context data and historical context data are compared to determine whether the current context data for the user is one of typical and unusual and to predict a future action of the user. A device shutdown notice is sent to a second device with the current context data, the determination of whether the current context data for the user is one of typical and unusual, and the prediction of the future action.

15 Claims, 15 Drawing Sheets

(56) References Cited

U.S. PATENT DOCUMENTS

2018/0181714 A1* 6/2018 Pillarisetty ............. G16H 50/30

OTHER PUBLICATIONS

Mell et al., "The NIST Definition of Cloud Computing" dated Sep. 2011, Recommendations of the National Institute of Standards and Technology, Total 7 pages.

Motorola et al., "Enabling Seamless Contextual Collaborations for Mobile Enterprises" dated Feb. 27, 2007, An IP.com Prior Art Database Technical Disclosure for IP.com No. IPCOM000146924D, Total 8 pages.

Anonymous et al., "Method and Apparatus for Mobile Identity Authentication" dated Mar. 29, 2010, An IP.com Prior Art Database Technical Disclosure for IP.com No. IPCOM000194545D, Total 71 pages.

Y. Tseytlin, "Method by Which Information Is Shared Given a Time, Date, or Location to Enhance Historical Significance of Web Based Content" dated May 1, 2014, An IP.com Prior Art Database Technical Disclosure for IP.com No. IPCOM000236538D, Total 28 pages.

Anonymous et al., "An IoT System that Combines Externally Sourced and Public Sensor Data with Internal Enterprise Sensor Data for Action Determination" dated Sep. 4, 2018, An IP.com Prior Art Database Technical Disclosure for IP.com No. IPCOM000255135D, Total 23 pages.

"Artificial Intelligence and Life in 2030" dated Sep. 2016, One Hundred Year Study on Ailincial Intelligence , Report of the 2015 Study Panel,Total 27 pages.

M. Smith, "Ailincial Intelligence and Human Development" dated Apr. 2018, Total 63 pages.

K. Guo et al., "Artificial Intelligence-Based Semantic Internet of Things in a User-Centric Smart City", received Mar. 27, 2018, accepted Apr. 23, 2018, and published Apr. 26, 2018, Total 22 pages.

"The Internet of Things" The Digitalization Transformation in the Digital Economy, (online) retrieved fom the Internet on Jul. 29, 2019 at URL> http://www.infiniteinformationtechnology.com/iot-wearables-wearable-device-market, Total 3 pages.

* cited by examiner

```
In [ ]: [
  User Activity Information
  {
   "User profile":
   {      "_id": "89d200cfc5b714a835e1",
          "age": "28",
          "domain": "System's Engineer",
          "organization": "DB" },
          "activity": [
          { "time": "2018-08-07T11:12:33.345Z",
             "type": "Workout",
             "content": "Gym Cardio"
   },
   {      "time": "2018-08-07T11:13:23.125Z",
          "Type": "Ongoing conversation",
          "Content": "What time are you coming back?"
   }
  ]
 }

Activity status
  {      "Alert Type": "Battery critical state"
         "time": "2018-08-07T11:12:35.345Z",
         "current_step": "3.1",
         "status": "in progress"
         "Alert Message Creation": "Battery is in critical state, and user is
working out. Based on pattern history, user is expected to return home in 30
minutes."
  }
```

FIG. 2

Critical Assessment - Matrix & Weights

| Risk and/or Critical Assessment | Probability 0-1.0 (Correlation Data) | Impact of Influence (weight) (1-10) | Fluctuating Risk Score (live monitoring and calculation as inputs change) |
|---|---|---|---|
| Object data 1 - users pace/accelerometer data. Perhaps impact/fall indication of user. | 0.8 | 7 | 5.6 |
| Network data 1 - micro/mesh network, population density, how many people are simultaneously connected. Increased population based on context of environment may increase risk factors. | 0.98 | 10 | 9.8 |
| Object data 2 - Gyroscope from devices, queues in calculating stabilization of device and user/user groups. | 0.7 | 6 | 4.2 |
| Correlated context - GPS location, augmented situational awareness. Specific locations may generate greater risk. Ie: along a freeway, nightclub, versus a soccer field, arcade. | 0.6 | 4 | 2.4 |
| Correlated context - biometric vitals monitoring, a direct link to the user's status. Increased risk weights here. | 0.6 | 6 | 3.6 |
| Crowdsourced vitals | 0.6 | 4 | 2.4 |
| Crowdsourced Device data | 0.8 | 7 | 5.6 |
| Correlated context - environment sounds | 0.5 | 4 | 2 |
| Other input | 0.9 | 10 | 9 |
| Other input | 0.7 | 8 | 5.6 |
| Object Data 3 | 0.6 | 8 | 4.8 |
| Correlated context | 0.9 | 7 | 6.3 |
| Image Data 3 - pictures taken, video feeds/user devices from user and/or crowdsourced. | 0.6 | 8 | 4.8 |
| | | | 66.1 |

FIG. 5

DEVICE LINKED CONTEXT IDENTIFICATION AND NOTIFICATION

BACKGROUND

1. Field of the Invention

Embodiments of the invention relate to device linked context identification and notification. In particular, embodiments relate to obtaining user heuristics from device linked context identification in mobile communication. The context identification may be used to determine whether a user's context is typical or unusual and to predict a future action of the user.

2. Description of the Related Art

Cellular ("cell") phones and computers allow people to communicate across distances, which permits contacts that could not otherwise occur, but eliminates some information that occurs in the context of physical presence.

SUMMARY

In accordance with embodiments, a computer-implemented method is provided for device linked context identification and notification. The computer-implemented method comprises operations. Context data of a user profile of a user is retrieved from an external storage, where the context data comprises data about user activities of the user and surrounding activities around the user. The context data is analyzed to place the user activities and the surrounding activities in activity categories and to assign tags for the user activities and the surrounding activities, where each of the tags is associated with an activity of the user activities and the surrounding activities and indicates an activity category of the activity categories, a location, and a timestamp. A notification that shutdown of a first device being used by the user is about to occur is received. Current context data having a current timestamp and historical context data having an earlier timestamp stored in the user profile for the user of the first device is compared to determine whether the current context data for the user is one of typical and unusual and to predict a future action of the user. A device shutdown notice is sent to a second device, where the device shutdown notice includes the current context data, the determination of whether the current context data for the user is one of typical and unusual, and the prediction of the future action.

In accordance with other embodiments, a computer program product is provided for device linked context identification and notification. The computer program product comprises a computer readable storage medium having program code embodied therewith, the program code executable by at least one processor to perform operations. Context data of a user profile of a user is retrieved from an external storage, where the context data comprises data about user activities of the user and surrounding activities around the user. The context data is analyzed to place the user activities and the surrounding activities in activity categories and to assign tags for the user activities and the surrounding activities, where each of the tags is associated with an activity of the user activities and the surrounding activities and indicates an activity category of the activity categories, a location, and a timestamp. A notification that shutdown of a first device being used by the user is about to occur is received. Current context data having a current timestamp and historical context data having an earlier timestamp stored in the user profile for the user of the first device is compared to determine whether the current context data for the user is one of typical and unusual and to predict a future action of the user. A device shutdown notice is sent to a second device, where the device shutdown notice includes the current context data, the determination of whether the current context data for the user is one of typical and unusual, and the prediction of the future action.

In yet other embodiments, a computer system is provided for device linked context identification and notification. The computer system comprises one or more processors, one or more computer-readable memories and one or more computer-readable, tangible storage devices; and program instructions, stored on at least one of the one or more computer-readable, tangible storage devices for execution by at least one of the one or more processors via at least one of the one or more memories, to perform operations. Context data of a user profile of a user is retrieved from an external storage, where the context data comprises data about user activities of the user and surrounding activities around the user. The context data is analyzed to place the user activities and the surrounding activities in activity categories and to assign tags for the user activities and the surrounding activities, where each of the tags is associated with an activity of the user activities and the surrounding activities and indicates an activity category of the activity categories, a location, and a timestamp. A notification that shutdown of a first device being used by the user is about to occur is received. Current context data having a current timestamp and historical context data having an earlier timestamp stored in the user profile for the user of the first device is compared to determine whether the current context data for the user is one of typical and unusual and to predict a future action of the user. A device shutdown notice is sent to a second device, where the device shutdown notice includes the current context data, the determination of whether the current context data for the user is one of typical and unusual, and the prediction of the future action.

BRIEF DESCRIPTION OF THE SEVERAL VIEWS OF THE DRAWINGS

Referring now to the drawings in which like reference numbers represent corresponding parts throughout:

FIG. 2 illustrates a message structure with analytics in accordance with certain embodiments.

FIG. 5 illustrates factors for generating a risk score in accordance with certain embodiments.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Embodiments include a recognition that the absence of information in remote communication, e.g., by cell phone, etc., may sometimes be problematic, particularly when the communication ends unexpectedly or abruptly or both. Further, unexpected or abrupt termination of remote communication may be more problematic in some circumstances than others.

Without information and context, it is difficult to know how to act and whether to act during a given communication and/or moment in time.

Communications themselves may be tricky to interpret, but so can the understanding of status for a given user or device by a receiving user who is not able to receive verbal communications any longer from a sending user. This may happen if a call drops (due to a telecommunication failure) or if a cell phone battery loses charge and makes the cell phone unusable until the battery is charged. For example, if a sending user's cell phone battery loses charge and is not usable until the battery is charged, this may create some level of anxiety for the sending user, however this may also cause concern for the receiving user on the other end of the conversation for the call that dropped when the battery lost charge. For example, if the receiving user is a mother, she may become worried as she does not know what has happened to the sending user (e.g., a child). As other examples, there have been stories about someone lost in the woods or in a vehicle stuck in a snow storm. It is possible that this sending user's cell phone stops working during a conversation, and the sending user's location is not tracked fast enough for rescuers to obtain the sending user's location before the cell phone battery runs out of charge.

Figure 1:
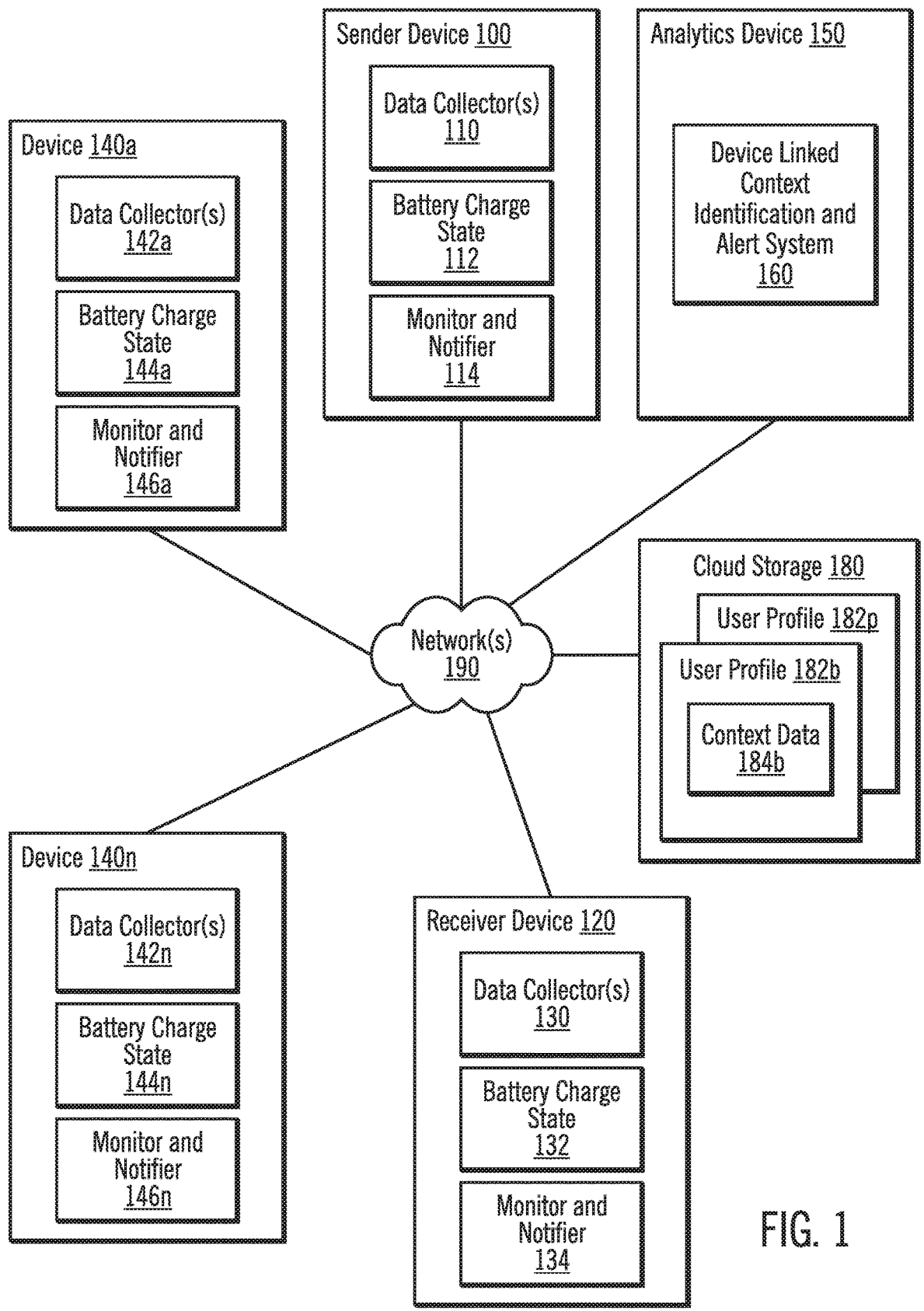
FIG. 1 illustrates, in a block diagram, a computing environment in accordance with certain embodiments.

FIG. 1 illustrates, in a block diagram, a computing environment in accordance with certain embodiments. A sender device 100, a receiver device 120, other devices 140a ... 140n, an analytics device 150, and cloud storage 180 are connected to each other via one or more networks 190.

The sender device 100 includes one or more data collectors 110, a battery charge state 112, and a monitor and notifier 114. The receiver device 100 includes one or more data collectors 130, a battery charge state 132, and a monitor and notifier 134. Each of the devices 140a ... 140n includes one or more data collectors 142a ... 142n, a battery charge state 144a ... 144n, and a monitor and notifier 146a ... 146n. The data collectors 142a ... 142n may be sensors, cameras, microphones, speakers, accelerometers, gyroscopes, GPS receivers or other data collectors. The data collectors 110, 142a ... 142n monitor activities of a user using the device and surrounding activities around the user (via sound, motion, geolocation, and visual information) to provide context data for the user. In certain embodiments, the visual information is from the device's camera; the sound includes transmitted and received sound via the device's microphone and speaker; the geolocation is via devices GPS location; and the motion is via the device's accelerometer, gyroscope, and GPS. In certain embodiments, the monitor and notifier 114, 134, 146a ... 146n of the respective devices 100, 120 140a ... 140n monitor and send the context data to external storage, such as the cloud storage 180, via the network 190 (e.g., a cellular network). Each user of a device 100, 120 140a ... 140n may have a user profile that stores the context data. The context data may be described as user heuristics.

Although one device is designated a sender device 100 and another device is designated a receiver device 120 to enhance understanding of embodiments, any device 100, 120, 140a ... 140n may be a sender device or a receiver device in various embodiments. The devices 100, 120, 140a ... 140n described herein may be smart phones, Internet of Things (IoT) wearable devices, cameras etc. The analytics device 150 may be part of a cloud infrastructure device.

The devices 100, 120, 140a ... 140n are able to communicate with each other and with the analytics device 150. The cloud storage 180 stores user profiles 182b ... 182p of users using the devices 100, 120, 140a ... 140n. In certain embodiments, each user profile 182b ... 182p includes the context data (e.g., the user profile 182b stores the context data 184b).

The analytics device 150 includes a Device Linked Context Identification and Alert (DLCIA) system 160. In certain embodiments, the DLCIA system 160 is an Artificial Intelligence (AI) module.

With embodiments, the DLCIA system 160 is part of a network connected infrastructure (e.g., a 4G network, a 5G network, a mesh network, a cellular network, etc.) and proactively communicates actions to be triggered based on the context data related to users and their surrounding who are using the sender device 100, the receiver device 120, and/or any device or devices 140a ... 140n.

In addition, when the battery charge state 112, 132, 144a ... 144n is below a threshold (signaling low battery that may cause the device 100, 120, 140a ... 140n to shut down), the monitor and notifier 114, 134, 146a ... 146n sends a notification of shutdown to the DLCIA system 160

The DLCIA system 160 employs reinforcement learning that is capable of observing a pattern history and context for use in predicting a future event based on a same context with high likelihood (or similar context), and such a prediction is relayed to the receiving device 120. A similar context may be described as one having a number of features (e.g., location at a particular time of day) that exceed a threshold in common with another context.

With embodiments, the DLCIA system 160 has opt-in system validation, which is a prerequisite for allowing processing of data and personal information sharing. Thus, embodiments are directed towards an opt-in-based system that may share user information between devices and the users of those devices. Initially, a user verifies and validates that the information is allowed to be shared in accordance with embodiments.

The information sharing may include (but is not limited to):
- personal information of the user provided by the user or provided by the device,
- device specifications pertaining to the device's software,
- device specifications pertaining to the device's hardware,
- tagging of location information of a device in order to infer context (where the location may be a Global Positioning Satellite (GPS) location, an indication of a building or landmark, a street address, etc.),
- timestamping of temporal data in order to infer contextual reference points,
- camera feeds (video and audio) taken from dynamic data sources pertaining to the device,
- social media feeds and social collaboration tooling and tagging, and
- sentiment analysis data pertaining to the user.

In certain embodiments, camera feeds are used for understanding the user's identity and storing a profile of the user in the cloud storage 180 (e.g., a cloud database). In certain embodiments, the profile of the user includes the user's speech features (e.g., for voice recognition) and facial features (e.g., for facial recognition). The sensors on the devices (e.g., IoT devices) may gather data from a diverse set of sources and retrieve a user's location and associated attributes (e.g., with cameras, wearable devices, linked devices, beacons etc.). Triangulation mechanisms may also be used to identify the user's location. The DLCIA system 160 then obtains the user's location and associated attributes from the user profile in the cloud storage 180.

A Convolutional Neural Network (CNN) may be used for image classification, while a Region-CNN (R-CNN) may be used for detecting a location. In certain embodiments, devices, such as IoT cameras, may run R-CNN modules with spatial detection using Open source Computer Vision (OpenCV, a library of functions) in order to track movement and location of a cluster of entities in a confined geo-fenced region.

As part of the user corpus of data used by the DLCIA system 160, the cloud storage 180 has access to user's social media accounts associated with the user's credentials in order to decide an action strategy post engagement.

In a user profile, user information (e.g., information input by a user) with associated metadata (e.g., obtained information or information generated from analysis, such as a geolocation) is stored in the cloud storage 180. The information is related to the user's activity and geotagged attributes.

For example, as interaction is enabled between different parties or entities of interest, the IoT camera feed triggers an analytics module of the DLCIA system 160 to initiate data aggregation and begin clustering a user's engagement level.

The collected data is labelled by analyzing speech features of different entities, tagging content after transcribing in the back-end cloud analytics device 150, and mapping the information to the user's profile. The same information is collected and stored for the other entity with whom the interaction is being done.

As the data is structured and analyzed, the DLCIA system 160 removes non-essential information and uses conversation analysis (e.g., a form of Natural Language Processing (NLP)) to focus on commonalities and activities, including intent (e.g., a primary intention of the conversation). FIG. 2 illustrates a message structure 200 with analytics in accordance with certain embodiments. In certain embodiments, the message structure is a JavaScript® Object Notation (JSON) message structure. (JavaScript is a registered trademark of Oracle Corporation in the United States and/or other countries.) In FIG. 2, a user is at a workout doing gym cardio when the batter of the user's devices enters a critical state (and needs to be recharged). When this happens, the DLCIA system 160 recognizes that there is an on-going conversation with a receiver device 120 and creates a message that: "Battery is in critical state, and user is working out. Based on pattern history, user is expected to return home in 30 minutes."

The DLCIA system 160 performs sentiment analysis from tokenized content that has been segmented for the one or more users engaging with each other, and emotions are extracted for each modular topic information that is extracted.

The module topic information may be clustered using K-means clustering in order to assess the commonalities, level of engagement, and activity status with respect to the user's contextual situation and attributes associated with linked devices in order to capture a criticality of the situation.

Reinforcement learning is enabled in the DLCIA system 160 of the analytics device 150 to understand whether the user accepted suggestions or information that was relayed to the other parties based on the contextual situation, in order to create user's pattern history and derive the action strategy for future engagement level.

Merely to enhance understanding of embodiments, examples of use cases are provided herein. However, embodiments are not to be limited to these examples.

Figure 3:
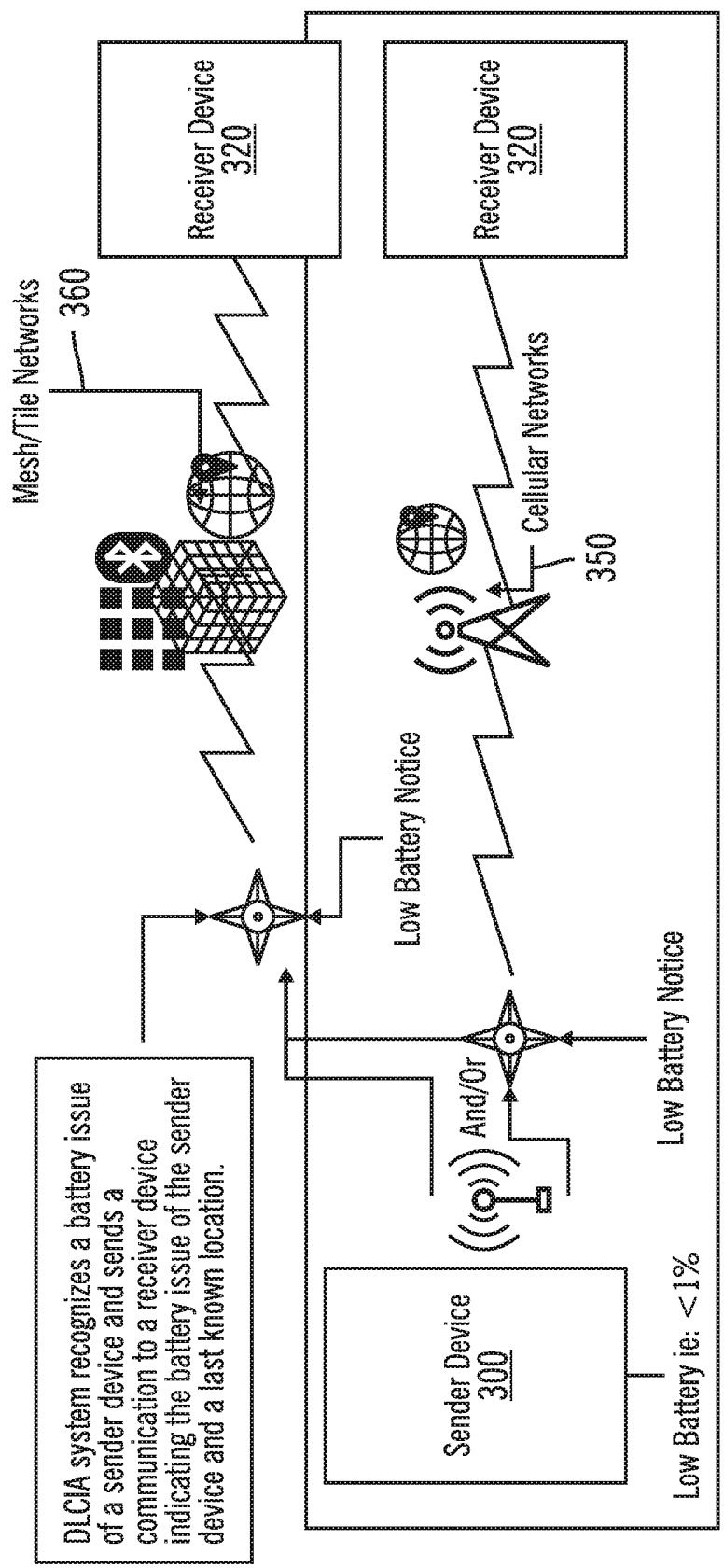
FIG. 3 illustrates a sender device and a receiver device communicating via different networks in accordance with certain embodiments.

FIG. 3 illustrates a sender device 300 and a receiver device 320 communicating via different networks in accordance with certain embodiments. In a first use case, 1. a receiver device 320 (e.g., a smart phone belonging to a parent) receives a call from a sender device 300 (e.g., another smart phone belonging to a child) via the cellular network 350 or the mesh network 360. However, the call drops a few moments into the conversation. The DLCIA system 160 recognizes that the battery charge state of the sender device 300 is low and has a last known location of the sender device 300. In response to the battery charge state being low, the DLCIA system 160 sends the receiver device 320 a notice that indicates that the battery charge state of the sender device 300 is low and provides the last known location of the sender device 300. With this, the parent using the receiver device 320 understands that the call dropped because the sender device has a low batter, but the parent also knows the last known location of the child using the sender device 300. With this context (e.g., location) and information (e.g., the battery charge state is low), the parent is able to determine that the child is at the last known location (e.g., school, soccer practice, etc.) and is able to pick up the child from the last known location.

With embodiments, the user of the sender device 300 and the user of the receiver device 320 have both agreed to opt-in to this level of information sharing. Also, with embodiments, there is an enabling network (e.g., a 5G network) that has the ability to capture large amounts of information and still maintain service levels. In certain embodiments, the last known location and the battery information may be tracked on a second by second basis and the last known relevant information is included within the transmission.

In a second use case, the cellular network 350 or the mesh network 360 is unable to provide the last known location information that the DLCIA system 160 requests when the battery charge state has gone critical (e.g., <1=X %), so another device in the opt-in network that is available (e.g., the cellular network 350 or the mesh network 360) picks up the beacon (i.e., a signal from a device) and sends along the approximate last known location of the sender device 300 that is being requested. For example, other smartphones or IoT devices near the sender device 300 may be able to send along the last known location of the sender device 300.

In a third use case, a user of a sender device is having a conversation with a user of a receiver device, and the call drops with no low battery notification, but the sender device has opt-in wearable devices and sensors (e.g., a smart watch that has call capabilities and that monitors location, a number of steps walked, vitals information ("vital signs"), etc.). Then, the DLCIA system 160 receives information from the sender device that the sender device is moving (e.g., from an accelerometer or gyroscope of the sender device) and receives information that the vitals information of the user using the sender device are typical (normal). In addition, there may be other "same-service" opt-in devices are in the area of the sender device. Same-service may be described as devices using the same network and having the ability to communicate with each other. In such a case, if the DLCIA system 160 determines that these devices are also not able to participate in calls, the DLCIA system 160 determines that the sender device and these other devices are in a common outage zone. Alternately, if the DLCIA system 160 determines that just the sender device is not able to make calls, the DLCIA system 160 determines that the sender device is not in a common outage zone.

The DLCIA system 160 may generate a risk score for each device. In such a case, based on information from mesh devices in local proximity to the sender device, the DLCIA system 160 may be able to determine that there is a network glitch and that there is no score of concern to act on (i.e., the score indicates that the context and information seems to indicate a typical state).

In certain embodiments, persistent push notifications with system to system verification may be able to ensure that the notification of low battery was actually sent and a return receipt is optionally generated (e.g., as required or when needed).

Figure 4:
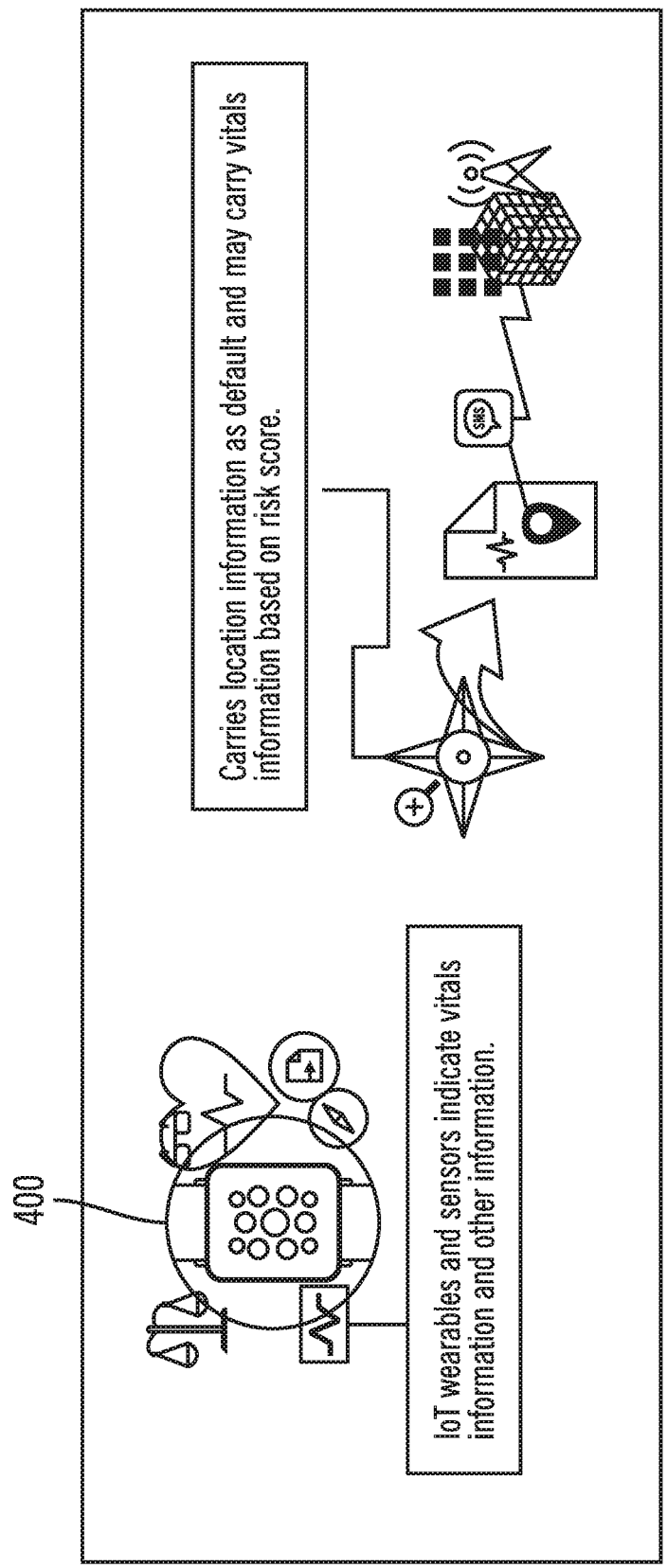
FIG. 4 illustrates a wearable device providing information in accordance with certain embodiments.

FIG. 4 illustrates a wearable device 400 providing information in accordance with certain embodiments. In FIG. 4, the wearable device 400 indicates information, such as location, number of steps walked, vitals information (e.g., heart rate), etc.

In a fourth use case, a user using a sender device is talking to someone using a receiver device, and the call drops. The DLCIA system 160 detects that there is no movement of the sender device, but the DLCIA system 160 receives information on vitals information per a wearable device of the user using the sender device. From the wearable device information, the DLCIA system 160 is able to determine whether other devices nearby are moving and may monitor this situation. The DLCIA system 160 uses the information to adjust the risk score over time.

FIG. 5 illustrates factors for generating a risk score in accordance with certain embodiments. With embodiments, the probability times ("X") the impact of influence equals ("=") the fluctuating risk score. The fluctuating risk score for each of the factors is summed to generate the risk score (e.g., 66.1 in FIG. 5). The risk score may be used to determine an action to be performed (e.g., notifying a relative or friend, sending emergency services to the location, etc.).

Figure 6:
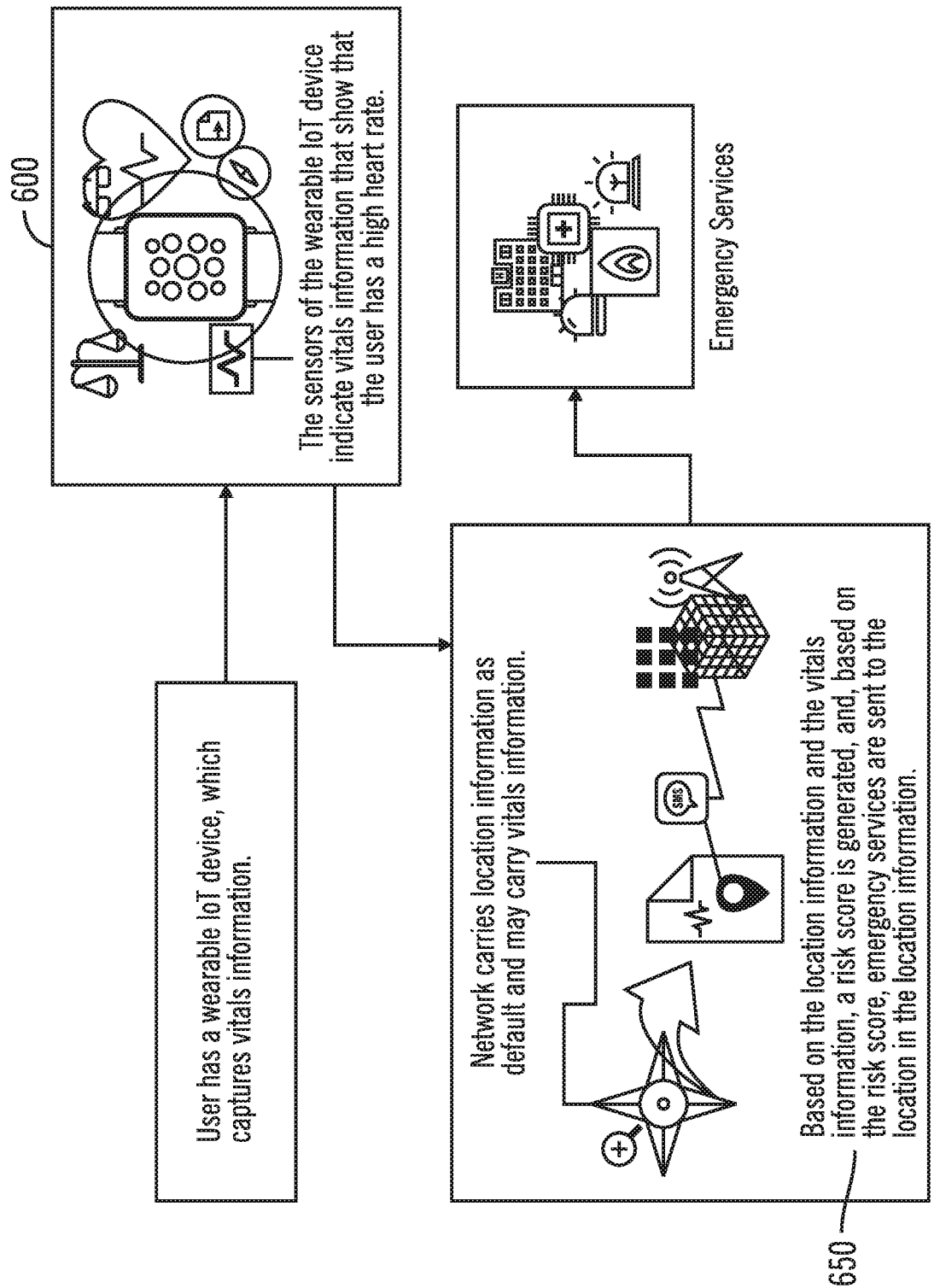
FIG. 6 illustrates use of a risk score in accordance with certain embodiments.

FIG. 6 illustrates use of a risk score in accordance with certain embodiments. In FIG. 6, a user wears a wearable IoT device 600, which captures vitals information of the user. In certain embodiments, the network carries location information as a default. The network may carry vitals information as biosignals, based on risk or threat indicators (e.g., the network carries the vitals information if the heart rate is high). Based on the context information of devices on the network, the DLCIA system 160 generates a risk score. Then, based on the risk score, the DLCIA system 160 assesses that there is an emergency related to the user and sends a notification to emergency services with the location of the user and, optionally, with the vitals information.

In a fifth use case, a user A on a sender device is talking to a user B on a receiver device, and that call drops. Devices in the area collectively identify the sound of an explosion and send to the DLCIA system 160. The DLCIA system 160 determines that user A's movement becomes minimized, and IoT wearable devices worn by user A indicate that user A has fallen down, while an IoT health device captures dramatic drops in blood pressure and rapid heart rate (which may be indicators of panic). Based on this, the DLCIA system 160 generates an elevated risk score.

The DLCIA system 160 identifies sounds that have specific meaning for nearby devices. Those sounds may be able to be known and kept within a learning-based corpus of knowledge that is ever growing and based on additional crowdsourced data for related contextual sounds and connected events. This evolving database of sounds that has a contextual corpus of event-based knowledge will serve as triggers for event determination within a suitable level of confidence to infer a potential emergency situation.

Crowd monitoring takes place based on the assessed risk score and indicates panic in a 100-meter radius. Based on these context indicators, the DLCIA system 160 notifies the local authorities to respond to the public panic and notifies emergency services (e.g., an ambulance, fire engine, etc.) to respond to user A's condition based on the vitals information.

Figure 7:
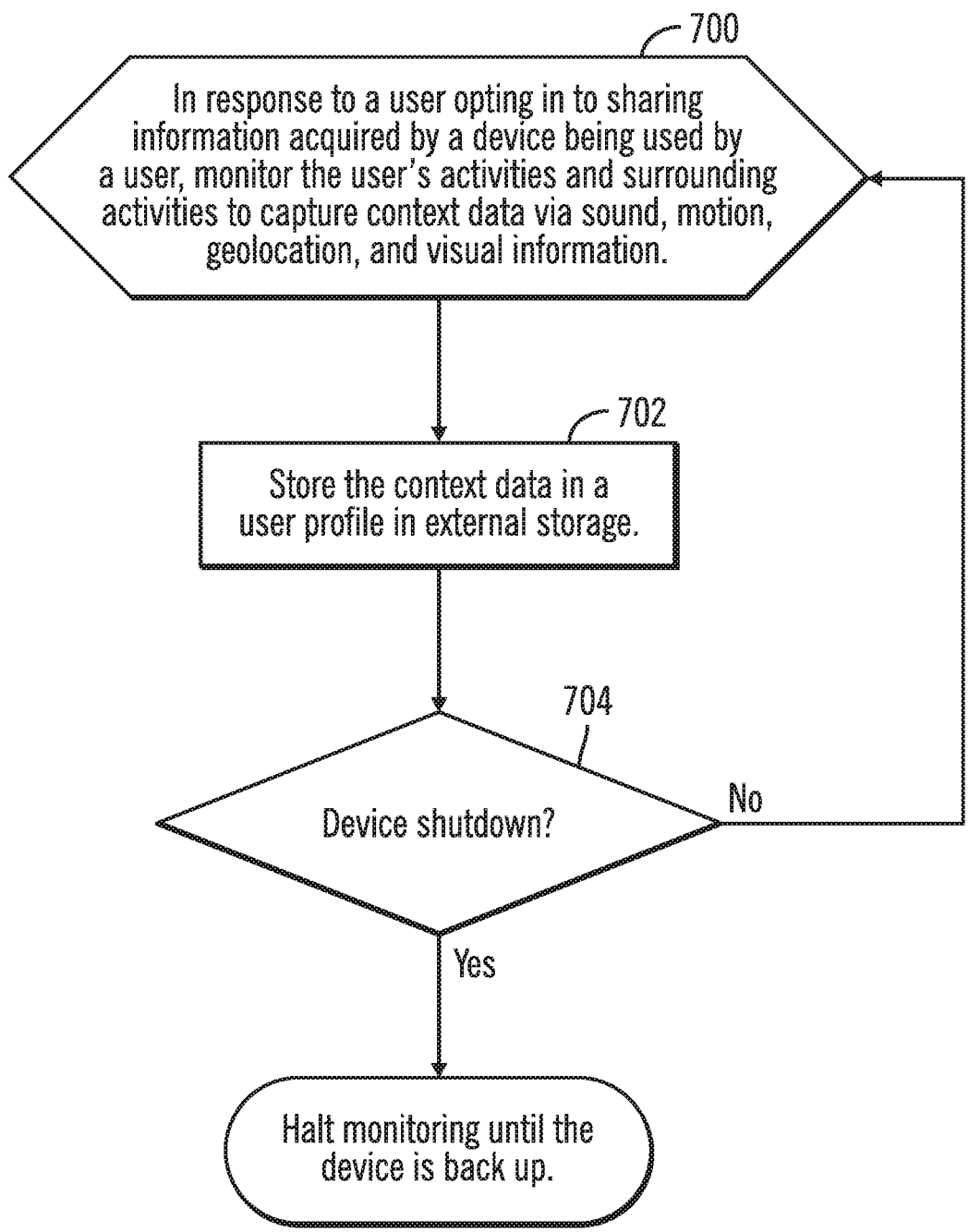
FIG. 7 illustrates, in a flowchart, operations for creating a user profile with context data in accordance with certain embodiments.

FIG. 7 illustrates, in a flowchart, operations for creating a user profile with context data in accordance with certain embodiments. In response to a user opting in to sharing information acquired by a device being used by the user, control begins at block 700 with the monitor and notifier of the device monitoring the user activities and surrounding activities around the user to capture context data via sound, motion, geolocation, and visual information. In certain embodiments, the sound includes transmitted and received sound via the device's microphone and speaker, the motion is via the device's accelerometer and GPS, the geolocation is via devices GPS location, and the visual information is from device's camera. The device sends the first user activity data to external storage via a cellular network.

In block 702, the monitor and notifier of the device stores the context data in a user profile in external storage (e.g., stores the context data in the cloud storage 180 via a cellular network). In block 704, the monitor and notifier of the device determines whether the device has shutdown. If so, processing is halted until the device is back up, otherwise, processing continues to block 700.

Figure 8:
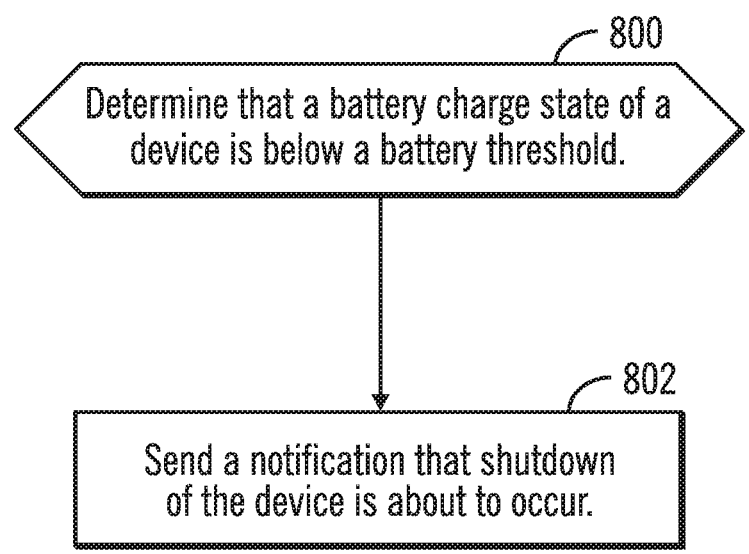
FIG. 8 illustrates, in a flowchart, operations for a device sending a notification of its shutdown in accordance with certain embodiments.

FIG. 8 illustrates, in a flowchart, operations for a device sending a notification of its shutdown in accordance with certain embodiments. Control begins at block 800 with the monitor and notifier of the device determining that the battery charge state of the device is below a battery threshold. In block 802, the monitor and notifier of the device sends, to the DLCIA system 160, a notification that shutdown of the device is about to occur.

Figure 9:
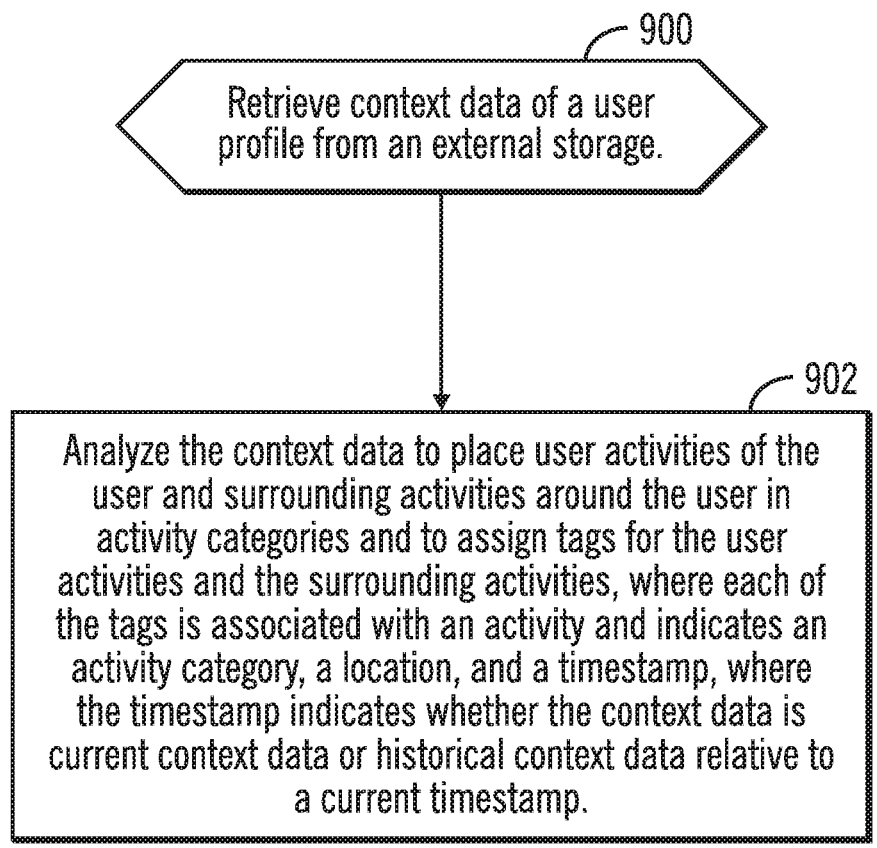
FIG. 9 illustrates, in a flowchart, operations for analyzing context data in accordance with certain embodiments.

FIG. 9 illustrates, in a flowchart, operations for analyzing context data in accordance with certain embodiments. control begins at block 900 with the DLCIA system 160 retrieving the context data of a user profile from the external storage (e.g., the cloud storage 180). In block 902, the DLCIA system 160 analyzes the context data to place activities of the user and of the surroundings around the user in activity categories and to assign tags for the activities, where each of the tags is associated with an activity and indicates an activity category, a location, and a timestamp, where the timestamp indicates whether the context data is current context data or historical context data relative to a current timestamp.

Figure 10:
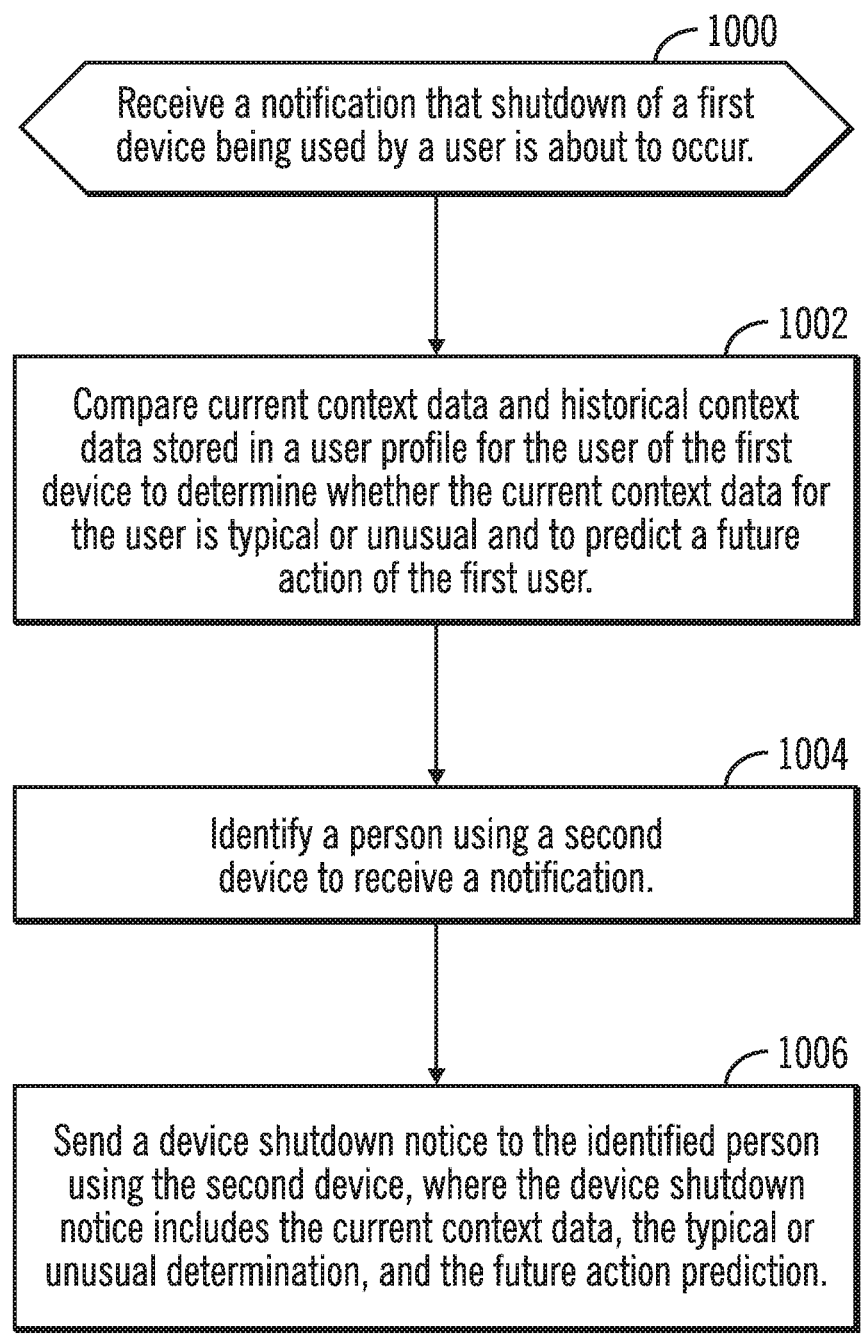
FIG. 10 illustrates, in a flowchart, operations for sending a second device shutdown information about a first device based on context data in accordance with certain embodiments.

FIG. 10 illustrates, in a flowchart, operations for sending a second device shutdown information about a first device based on context data in accordance with certain embodiments. Control begins at block 1000 with the DLCIA system 160 receiving a notification that shutdown of a first device being used by a user is about to occur. In block 1002, the DLCIA system 160 compares a current context data (having a current timestamp) and historical context data (having older timestamps) stored in a user profile for the user of the first device to determine whether the current context data for the user is typical or unusual (not typical or atypical) and to predict a future action of the first user. In block 1004, the DLCIA system 160 identifies a person using a second device to receive a notification based on the context data. In certain embodiments, there are rules that indicate who should receive the notification based on the activities of the user, the location of the user, the current timestamp, the surroundings information, etc. In block 1006, the DLCIA system 160 sends a device shutdown notice to the identified person using the second device, where the device shutdown notice includes the current context data, the typical or unusual determination, and the future action prediction. That is, the notification is sent from the DLCIA system 160 to the second device. In certain embodiments, there are rules for determining whether the current context data is typical or unusual and additional rules for predicting the future action of the user.

Figure 11:
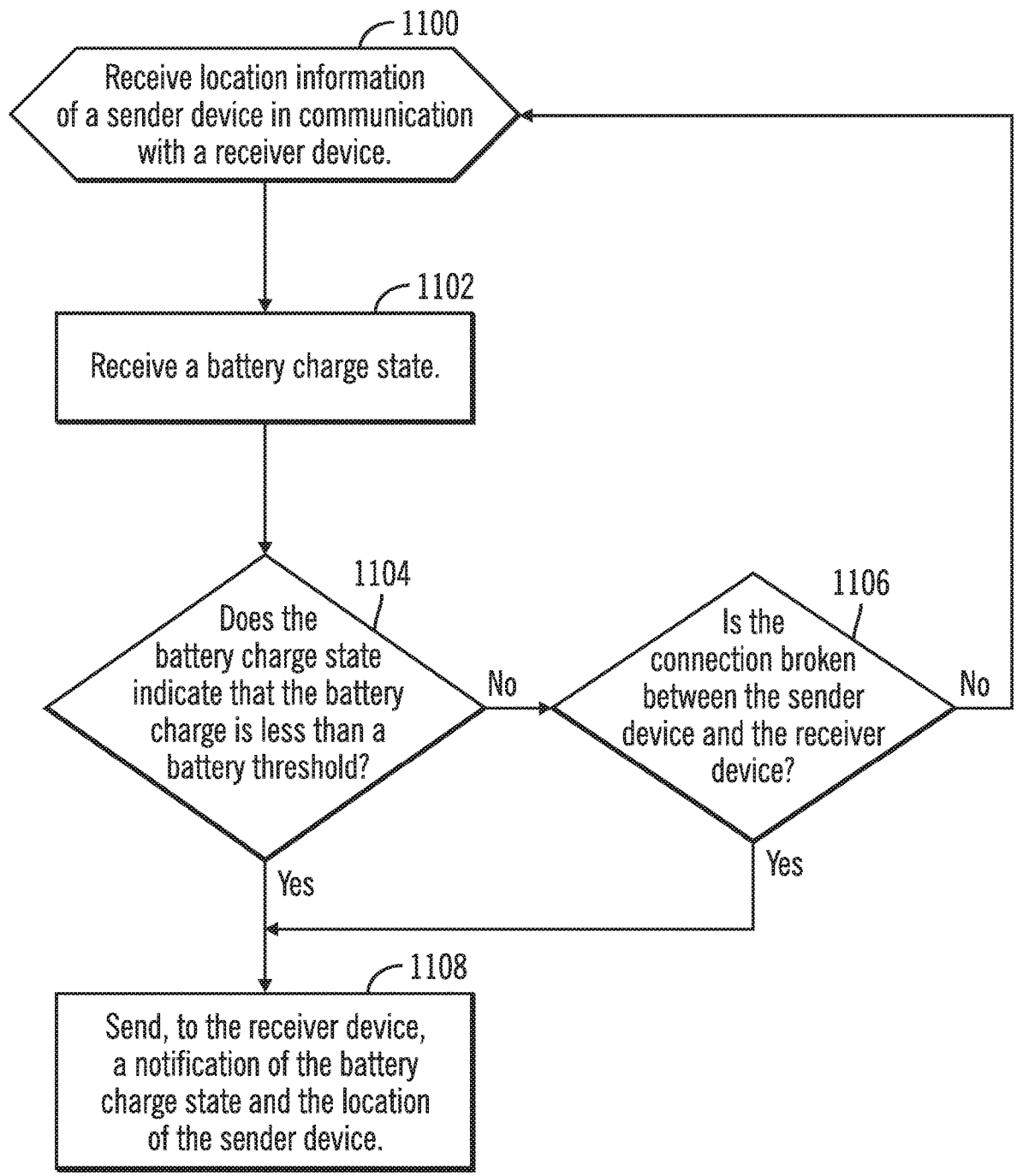
FIG. 11 illustrates, in a flowchart, operations for sending a notification of a low battery charge in accordance with certain embodiments.

FIG. 11 illustrates, in a flowchart, operations for sending a notification of a low battery charge in accordance with certain embodiments. Control begins at block 1100 with the DLCIA system 160 receiving location information of a sender device in communication with a receiver device. In block 1102, the DLCIA system 160 receives a battery charge state. In block 1104, the DLCIA system 160 determines whether the battery charge state indicates that the battery charge is less than a battery threshold. If so, processing continues to block 1108, otherwise, processing continues to block 1106.

In block 1106, the DLCIA system 160 determines whether the connection is broken between the sender device and the receiver device. If so, processing continues to block 1108, otherwise, the processing continues to block 1100. In block 1108, the DLCIA system 160 sends, to the receiver device, a notification of the battery charge state and the location of the sender device. In certain embodiments, additional information may be sent.

Figure 12:
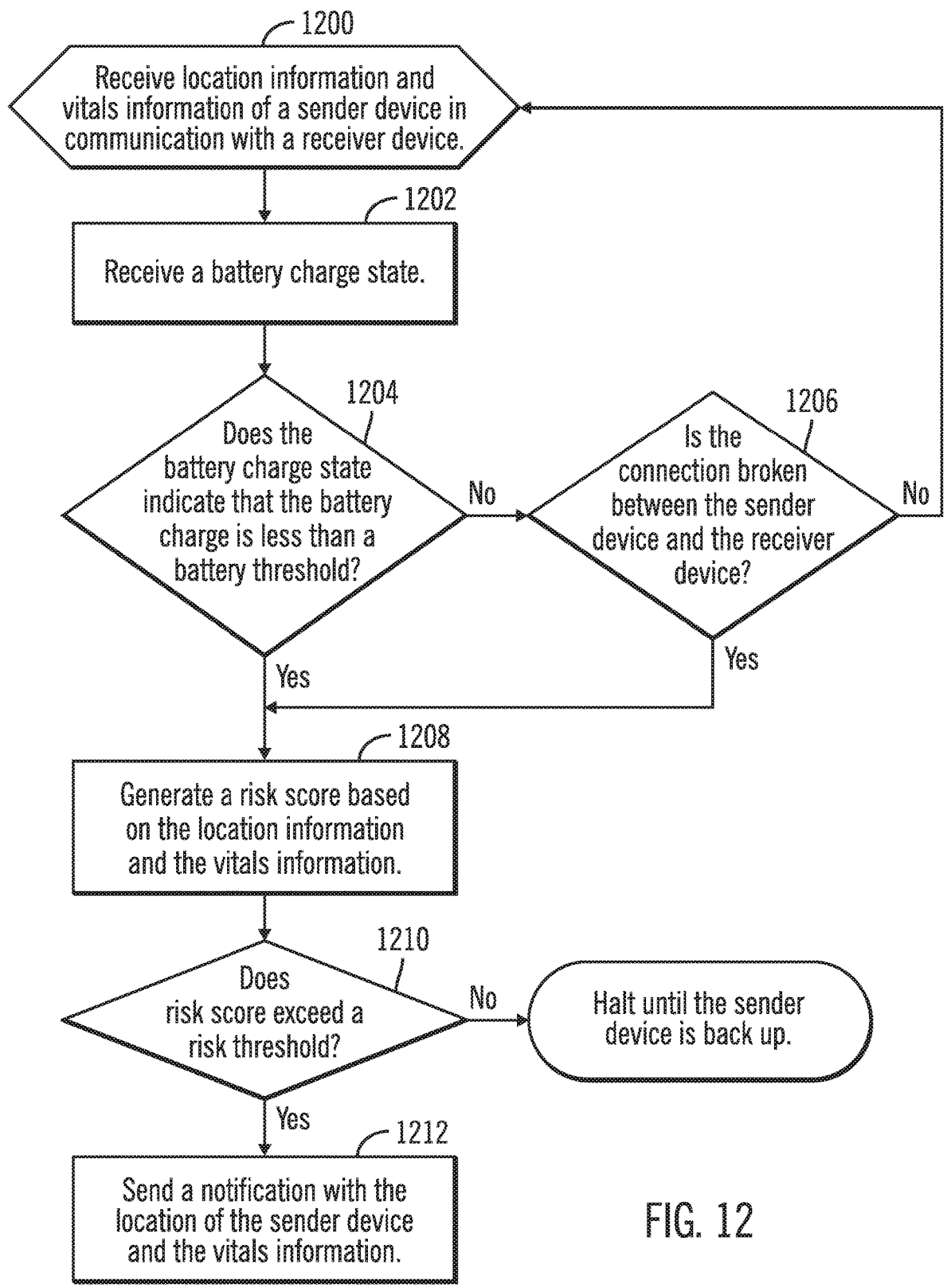
FIG. 12 illustrates, in a flowchart, operations for sending a notification based on a risk score in accordance with certain embodiments.

FIG. 12 illustrates, in a flowchart, operations for sending a notification based on a risk score in accordance with certain embodiments. Control begins at block 1200 with with the DLCIA system 160 receiving location information and vitals information of a sender device in communication with a receiver device. In block 1202, the DLCIA system 160 receives a battery charge state. In block 1204, the DLCIA system 160 determines whether the battery charge state indicates that the battery charge is less than a battery threshold. If so, processing continues to block 1208, otherwise, processing continues to block 1206.

In block 1206, the DLCIA system 160 determines whether the connection is broken between the sender device and the receiver device. If so, processing continues to block 1208, otherwise, the processing continues to block 1200.

In block 1208, the DLCIA system 160 generates a risk score based on the location information and the vitals information. In block 1210, DLCIA system 160 determines whether the risk score exceed a risk threshold. If so, processing continues to block 1212, otherwise, processing halts until the sender device is back up. In block 1212, the DLCIA system sends a notification (e.g., to emergency services) with the location of the sender device and the vitals information.

Embodiments are able to identify a user's location based on context, which allows action based on the user's location. Such informative context is useful when applied to human activity and also useful when applied to the status/health of devices themselves, especially since the number of those devices continue to grow in volume.

With embodiments, how these devices "see each other", either anonymously or known to each other, derives useful heuristics and contexts to improve, bring insight, and further secure people's daily lives.

Thus, in certain embodiments, based on first user opting in, a device (e.g., a smartphone) monitors a first user's activities (e.g., the user speaking) and surrounding activities (e.g., conversation of someone speaking to the first user, other sounds, such as traffic, dogs barking, etc.), via sound, motion, geolocation, and visual information, to collect context data for the first user. The visual information is from device's camera, the sound includes transmitted and received sound via the device's microphone and speaker, the geolocation is via devices GPS location, and the motion is via the device's accelerometer and GPS. The device sends the first user activity data to external storage via a cellular network.

In response to the device detecting that shutdown of phone is imminent (based on the battery charge state), the device sends a shutdown signal to the DLCIA system 160.

In certain embodiments, the DLCIA system 160 (i.e., an AI module) analyzes the stored context data of the first user and the first user's surroundings, categorizes the stored activities, and assigns tags indicating the activity category, location, and timestamp. Such information provides context data for the first user and the first user's surroundings.

In response to device shutdown signal, the DLCIA system 160 analyzes the stored context data, which includes comparing current context data and historical context data, to determine whether the first user's context is typical (normal) or unusual and to predict a future action of the first user.

The DLCIA system 160 then sends a device shutdown notice to a predetermined person, where the notice includes the current activity context data, typical or unusual determination, and future action prediction. The DLCIA system 160 may send the notice to a person whose identity the DLCIA system 160 determines from the current or predicted future activity context data, such as, for example, the last person to whom the first user communicated with via the device, or such as, for example, the next person with whom the first user will communicate.

In other embodiments, the DLCIA system 160 analysis of the monitored activities of the first user and the first user's surroundings, which includes comparing the current context data and the historical context data, may detect an emergency occurring in the first user's surroundings. For example, sounds may be a basis for this determination in some cases. In response to detection of the emergency, the DLCIA system 160 sends notice of the emergency to a predetermined person, where the notice includes the current activity context data, typical or unusual determination, and future action prediction. The DLCIA system 160 may send the notice to a person whose identity the DLCIA system 160 determines from the current activity context data, such as, for example, the last person to whom the first user communicated with via the phone, or such as, for example, the next person with whom the first user will communicate.

Figure 13:
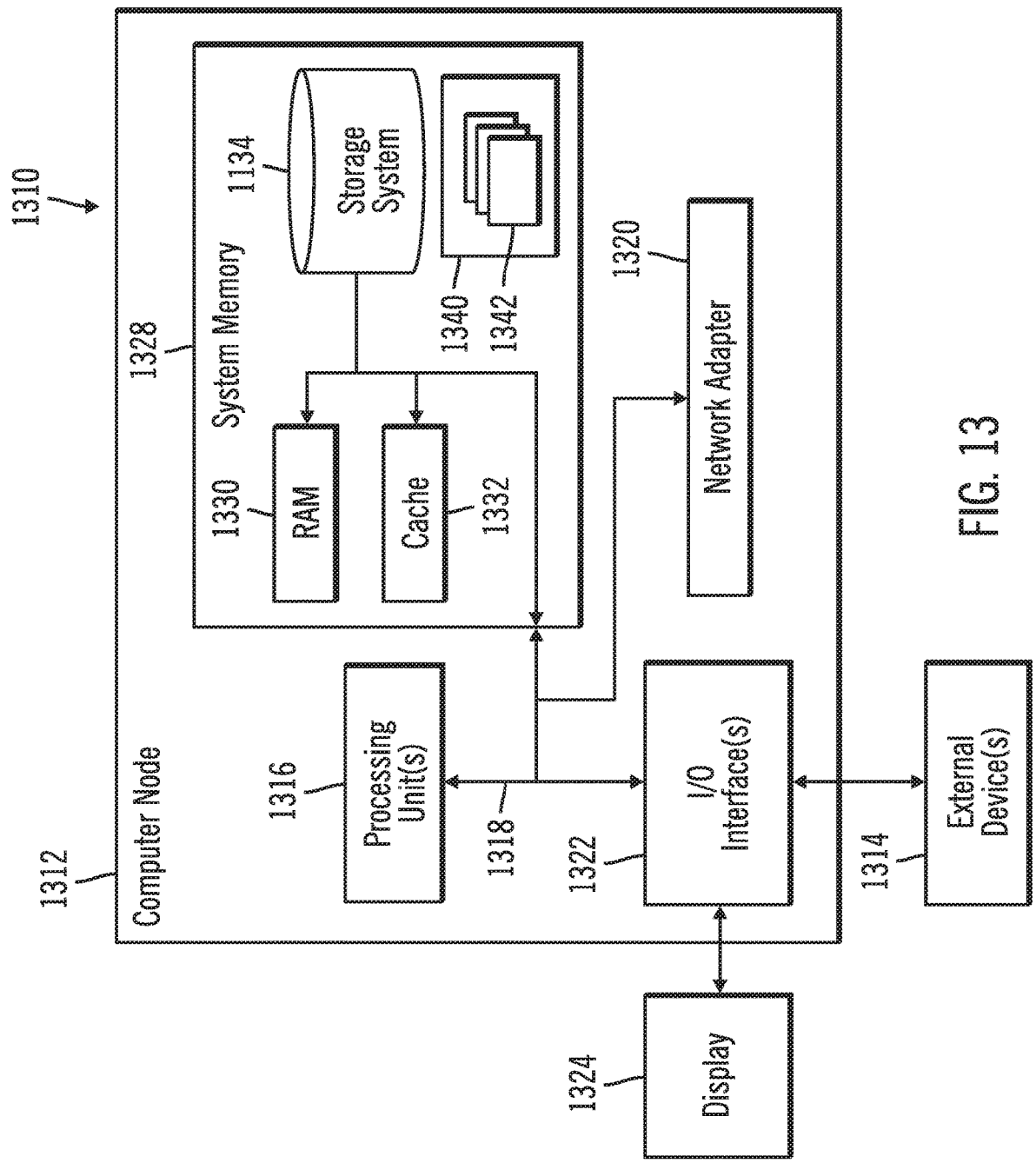
FIG. 13 illustrates a computing node in accordance with certain embodiments.

FIG. 13 illustrates a computing environment 1310 in accordance with certain embodiments. In certain embodiments, the computing environment is a cloud computing environment. Referring to FIG. 13, computer node 1312 is only one example of a suitable computing node and is not intended to suggest any limitation as to the scope of use or functionality of embodiments of the invention described herein. Regardless, computer node 1312 is capable of being implemented and/or performing any of the functionality set forth hereinabove.

The computer node 1312 may be a computer system, which is operational with numerous other general purpose or special purpose computing system environments or configurations. Examples of well-known computing systems, environments, and/or configurations that may be suitable for use with computer node 1312 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer node 1312 may be described in the general context of computer system executable instructions, such as program modules, being executed by a computer system. Generally, program modules may include routines, programs, objects, components, logic, data structures, and so on that perform particular tasks or implement particular abstract data types. Computer node 1312 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 13, computer node 1312 is shown in the form of a general-purpose computing device. The components of computer node 1312 may include, but are not limited to, one or more processors or processing units 1316, a system memory 1328, and a bus 1318 that couples various system components including system memory 1328 to one or more processors or processing units 1316.

Bus 1318 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer node 1312 typically includes a variety of computer system readable media. Such media may be any available media that is accessible by computer node 1312, and it includes both volatile and non-volatile media, removable and non-removable media.

System memory 1328 can include computer system readable media in the form of volatile memory, such as random access memory (RAM) 1330 and/or cache memory 1332. Computer node 1312 may further include other removable/non-removable, volatile/non-volatile computer system storage media. By way of example only, storage system 1334 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1318 by one or more data media interfaces. As will be further depicted and described below, system memory 1328 may include at least one program product having a set (e.g., at least one) of program modules that are configured to carry out the functions of embodiments of the invention.

Program/utility 1340, having a set (at least one) of program modules 1342, may be stored in system memory 1328 by way of example, and not limitation, as well as an operating system, one or more application programs, other program modules, and program data. Each of the operating system, one or more application programs, other program modules, and program data or some combination thereof, may include an implementation of a networking environment. Program modules 1342 generally carry out the functions and/or methodologies of embodiments of the invention as described herein.

Computer node 1312 may also communicate with one or more external devices 1314 such as a keyboard, a pointing device, a display 1324, etc.; one or more devices that enable a user to interact with computer node 1312; and/or any devices (e.g., network card, modem, etc.) that enable computer node 1312 to communicate with one or more other computing devices. Such communication can occur via Input/Output (I/O) interfaces 1322. Still yet, computer node 1312 can communicate with one or more networks such as a local area network (LAN), a general wide area network (WAN), and/or a public network (e.g., the Internet) via network adapter 1320. As depicted, network adapter 1320 communicates with the other components of computer node 1312 via bus 1318. It should be understood that although not shown, other hardware and/or software components could be used in conjunction with computer node 1312. Examples, include, but are not limited to: microcode, device drivers, redundant processing units, external disk drive arrays, RAID systems, tape drives, and data archival storage systems, etc.

In certain embodiments, each of the sender device 100, the receiver device 120, the other devices 140a . . . 140n, and the analytics device 150 has the architecture of computer node 1312. In certain embodiments, the sender device 100, the receiver device 120, the other devices 140a . . . 140n, and the analytics device 150 are part of a cloud infrastructure. In certain alternative embodiments, the sender device 100, the receiver device 120, the other devices 140a . . . 140n, and the analytics device 150 are not part of a cloud infrastructure.

Cloud Embodiments

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 14:
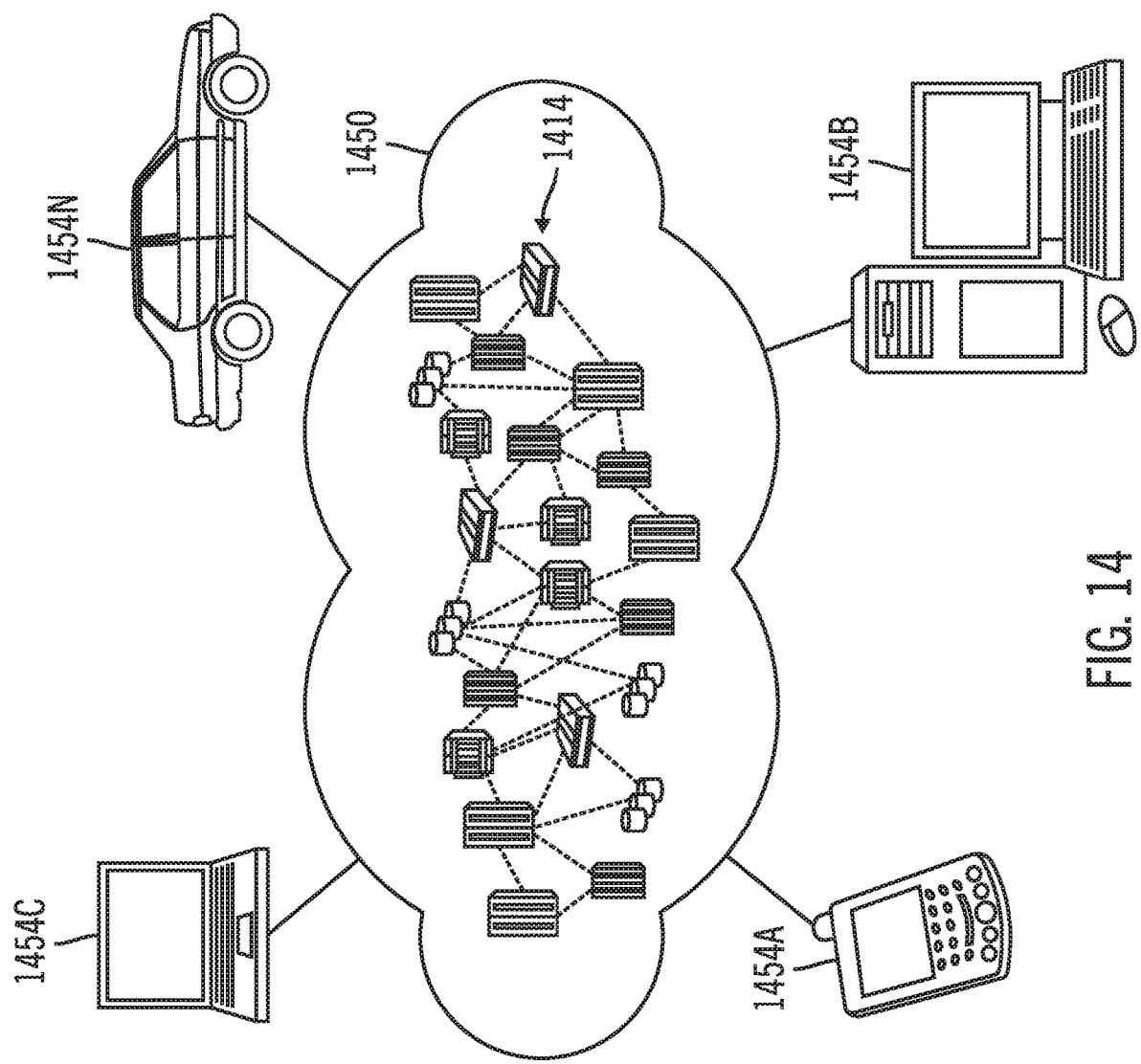
FIG. 14 illustrates a cloud computing environment in accordance with certain embodiments.

Referring now to FIG. 14, illustrative cloud computing environment 1420 is depicted. As shown, cloud computing environment 1420 includes one or more cloud computing nodes 1410 with which local computing devices used by cloud consumers, such as, for example, personal digital assistant (PDA) or cellular telephone 1454A, desktop computer 1454B, laptop computer 1454C, and/or automobile computer system 1454N may communicate. Nodes 1410 may communicate with one another. They may be grouped (not shown) physically or virtually, in one or more networks, such as Private, Community, Public, or Hybrid clouds as described hereinabove, or a combination thereof. This allows cloud computing environment 1420 to offer infrastructure, platforms and/or software as services for which a cloud consumer does not need to maintain resources on a local computing device. It is understood that the types of computing devices 1454A-N shown in FIG. 14 are intended to be illustrative only and that computing nodes 1410 and cloud computing environment 1420 can communicate with any type of computerized device over any type of network and/or network addressable connection (e.g., using a web browser).

Figure 15:
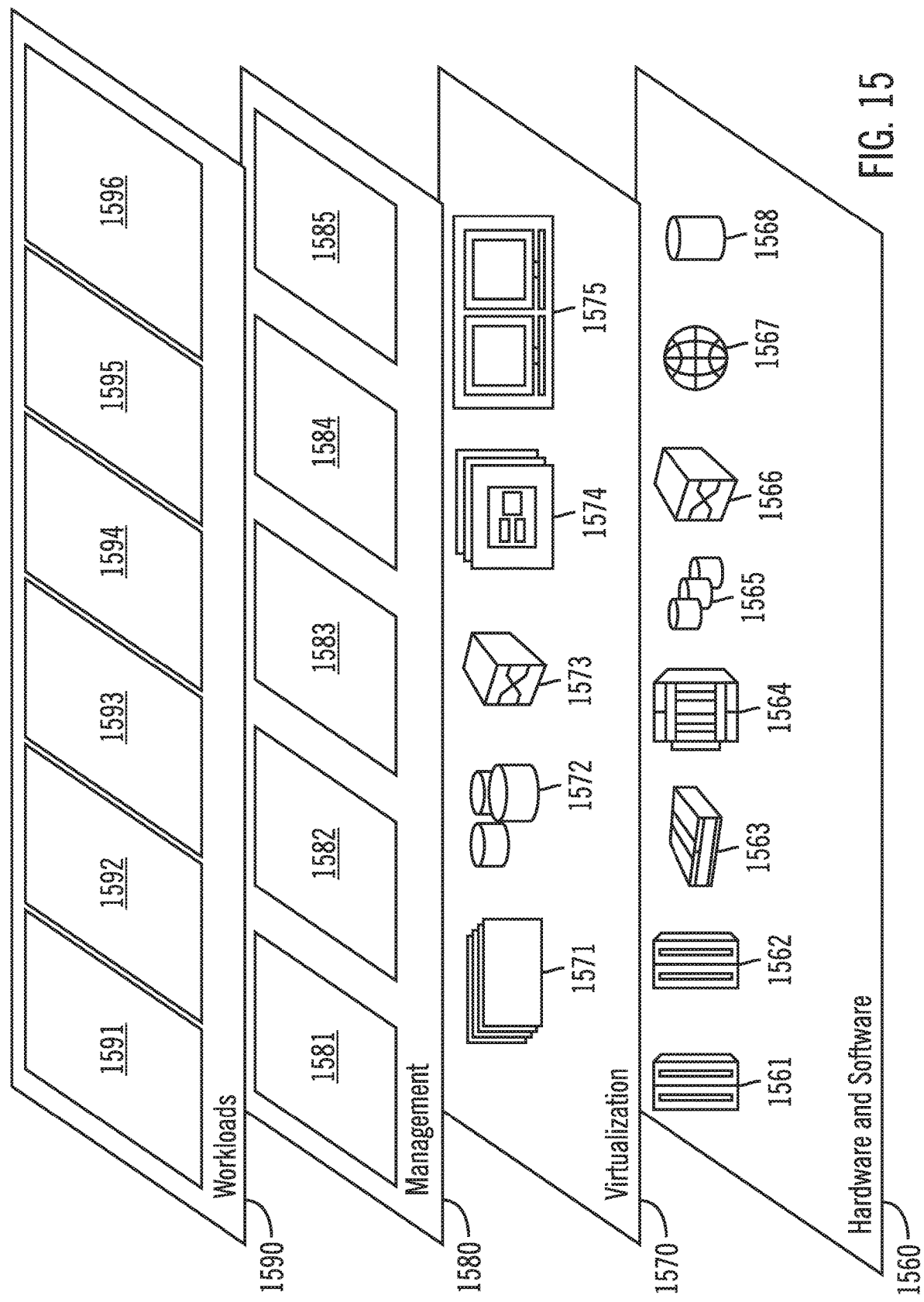
FIG. 15 illustrates abstraction model layers in accordance with certain embodiments.

Referring now to FIG. 15, a set of functional abstraction layers provided by cloud computing environment 1420 (FIG. 14) is shown. It should be understood in advance that the components, layers, and functions shown in FIG. 15 are intended to be illustrative only and embodiments of the invention are not limited thereto. As depicted, the following layers and corresponding functions are provided:

Hardware and software layer 1560 includes hardware and software components. Examples of hardware components include: mainframes 1561; RISC (Reduced Instruction Set Computer) architecture based servers 1562; servers 1563; blade servers 1564; storage devices 1565; and networks and networking components 1566. In some embodiments, software components include network application server software 1567 and database software 1568.

Virtualization layer 1570 provides an abstraction layer from which the following examples of virtual entities may be provided: virtual servers 1571; virtual storage 1572; virtual networks 1573, including virtual private networks; virtual applications and operating systems 1574; and virtual clients 1575.

In one example, management layer 1580 may provide the functions described below. Resource provisioning 1581 provides dynamic procurement of computing resources and other resources that are utilized to perform tasks within the cloud computing environment. Metering and Pricing 1582 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1583 provides access to the cloud computing environment for consumers and system administrators. Service level management 1584 provides cloud computing resource allocation and management such that required service levels are met. Service Level Agreement (SLA) planning and fulfillment 1585 provide pre-arrangement for, and procurement of, cloud computing resources for which a future requirement is anticipated in accordance with an SLA.

Workloads layer 1590 provides examples of functionality for which the cloud computing environment may be utilized. Examples of workloads and functions which may be provided from this layer include: mapping and navigation 1591; software development and lifecycle management 1592; virtual classroom education delivery 1593; data analytics processing 1594; transaction processing 1595; and device linked context identification and notification 1596.

Thus, in certain embodiments, software or a program, implementing device linked context identification and notification in accordance with embodiments described herein, is provided as a service in a cloud environment.

Additional Embodiment Details

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, embodiments of the invention reside in the claims herein after appended.

The foregoing description provides examples of embodiments of the invention, and variations and substitutions may be made in other embodiments.

What is claimed is:

1. A computer-implemented method, comprising operations for:
    retrieving context data of a user profile of a first user from an external storage, wherein the context data comprises data about user activities of the first user and surrounding activities around the first user;
    analyzing the context data to place the user activities and the surrounding activities in activity categories and to assign tags for the user activities and the surrounding activities, wherein each of the tags is associated with an activity of the user activities and the surrounding activities and indicates an activity category of the activity categories, a location, and a timestamp;
    receiving a notification from a first device that shutdown of the first device being used by the first user is about to occur;
    receiving a last known location of the first device from a second device being used by a second user near the first device;
    comparing current context data having a current timestamp and historical context data having an earlier timestamp stored in the user profile for the first user of the first device to determine whether the current context data for the first user is unusual and to generate a prediction of a future action of the first user;
    generating a score for each of a plurality of factors based on the location and vitals information of the first user, wherein each score for each factor of the plurality of factors comprises a probability times a weight;
    generating a risk score by summing each score; and
    in response to the risk score exceeding a risk threshold, sending a new notification to a third device being used by a third user, wherein the notification includes the current context data, the determination of whether the current context data for the first user is unusual, the last known location of the first device, the vitals information, and the prediction of the future action.

2. The computer-implemented method of claim 1, further comprising operations for:
  identifying the third user using the third device to receive the new notification using rules that indicate who should receive the notification based on the user activities, the location, the timestamp, and the surroundings activities.

3. The computer-implemented method of claim 1, further comprising operations for:
  under control of the first device,
    monitoring the user activities and the surrounding activities that comprises the context data; and
    storing the context data in the external storage.

4. The computer-implemented method of claim 1, further comprising operations for:
  under control of the first device, sending the notification that the shutdown of the first device is about to occur, wherein the shutdown is due to a battery charge state being low.

5. The computer-implemented method of claim 1, wherein a Software as a Service (SaaS) is configured to perform the operations of the computer-implemented method.

6. A computer program product, the computer program product comprising a computer readable storage medium having program code embodied therewith, the program code executable by at least one processor to perform operations for:
  retrieving context data of a user profile of a first user from an external storage, wherein the context data comprises data about user activities of the first user and surrounding activities around the first user;
  analyzing the context data to place the user activities and the surrounding activities in activity categories and to assign tags for the user activities and the surrounding activities, wherein each of the tags is associated with an activity of the user activities and the surrounding activities and indicates an activity category of the activity categories, a location, and a timestamp;
  receiving a notification from a first device that shutdown of the first device being used by the first user is about to occur;
  receiving a last known location of the first device from a second device being used by a second user near the first device;
  comparing current context data having a current timestamp and historical context data having an earlier timestamp stored in the user profile for the first user of the first device to determine whether the current context data for the first user is unusual and to generate a prediction of a future action of the first user;
  generating a score for each of a plurality of factors based on the location and vitals information of the first user, wherein each score for each factor of the plurality of factors comprises a probability times a weight;
  generating a risk score by summing each score; and
  in response to the risk score exceeding a risk threshold, sending a new notification to a third device being used by a third user, wherein the notification includes the current context data, the determination of whether the current context data for the first user is unusual, the last known location of the first device, the vitals information, and the prediction of the future action.

7. The computer program product of claim 6, wherein the program code is executable by the at least one processor to perform further operations for:
  identifying the third user using the third device to receive the new notification using rules that indicate who should receive the notification based on the user activities, the location, the timestamp, and the surroundings activities.

8. The computer program product of claim 6, wherein the program code is executable by the at least one processor to perform further operations for:
  under control of the first device,
    monitoring the user activities and the surrounding activities that comprises the context data; and
    storing the context data in the external storage.

9. The computer program product of claim 6, wherein the program code is executable by the at least one processor to perform further operations for:
  under control of the first device, sending the notification that the shutdown of the first device is about to occur, wherein the shutdown is due to a battery charge state being low.

10. The computer program product of claim 6, wherein a Software as a Service (SaaS) is configured to perform the operations of the computer program product.

11. A computer system, comprising:
  one or more processors, one or more computer-readable memories and one or more computer-readable, tangible storage devices; and
  program instructions, stored on at least one of the one or more computer-readable, tangible storage devices for execution by at least one of the one or more processors via at least one of the one or more computer-readable memories, to perform operations comprising:
  retrieving context data of a user profile of a first user from an external storage, wherein the context data comprises data about user activities of the first user and surrounding activities around the first user;
  analyzing the context data to place the user activities and the surrounding activities in activity categories and to assign tags for the user activities and the surrounding activities, wherein each of the tags is associated with an activity of the user activities and the surrounding activities and indicates an activity category of the activity categories, a location, and a timestamp;
  receiving a notification from a first device that shutdown of the first device being used by the first user is about to occur;
  receiving a last known location of the first device from a second device being used by a second user near the first device;
  comparing current context data having a current timestamp and historical context data having an earlier timestamp stored in the user profile for the first user of the first device to determine whether the current context data for the first user is unusual and to generate a prediction of a future action of the first user;
  generating a score for each of a plurality of factors based on the location and vitals information of the first user, wherein each score for each factor of the plurality of factors comprises a probability times a weight;
  generating a risk score by summing each score; and
  in response to the risk score exceeding a risk threshold, sending a new notification to a third device being used by a third user, wherein the notification includes the current context data, the determination of whether the current context data for the first user is unusual, the last known location of the first device, the vitals information, and the prediction of the future action.

12. The computer system of claim 11, wherein the operations further comprise:
  identifying the third user using the third device to receive the new notification using rules that indicate who should receive the notification based on the user activities, the location, the timestamp, and the surroundings activities.

13. The computer system of claim 11, wherein the operations further comprise:
  under control of the first device,
    monitoring the user activities and the surrounding activities that comprises the context data; and
    storing the context data in the external storage.

14. The computer system of claim 11, wherein the operations further comprise:
  under control of the first device, sending the notification that the shutdown of the first device is about to occur, wherein the shutdown is due to a battery charge state being low.

15. The computer system of claim 11, wherein a Software as a Service (SaaS) is configured to perform operations of the computer system.

\* \* \* \* \*